June 27, 1950 W. H. KLIEVER ET AL 2,512,746
GYROSCOPIC INSTRUMENT
Filed Sept. 24, 1945
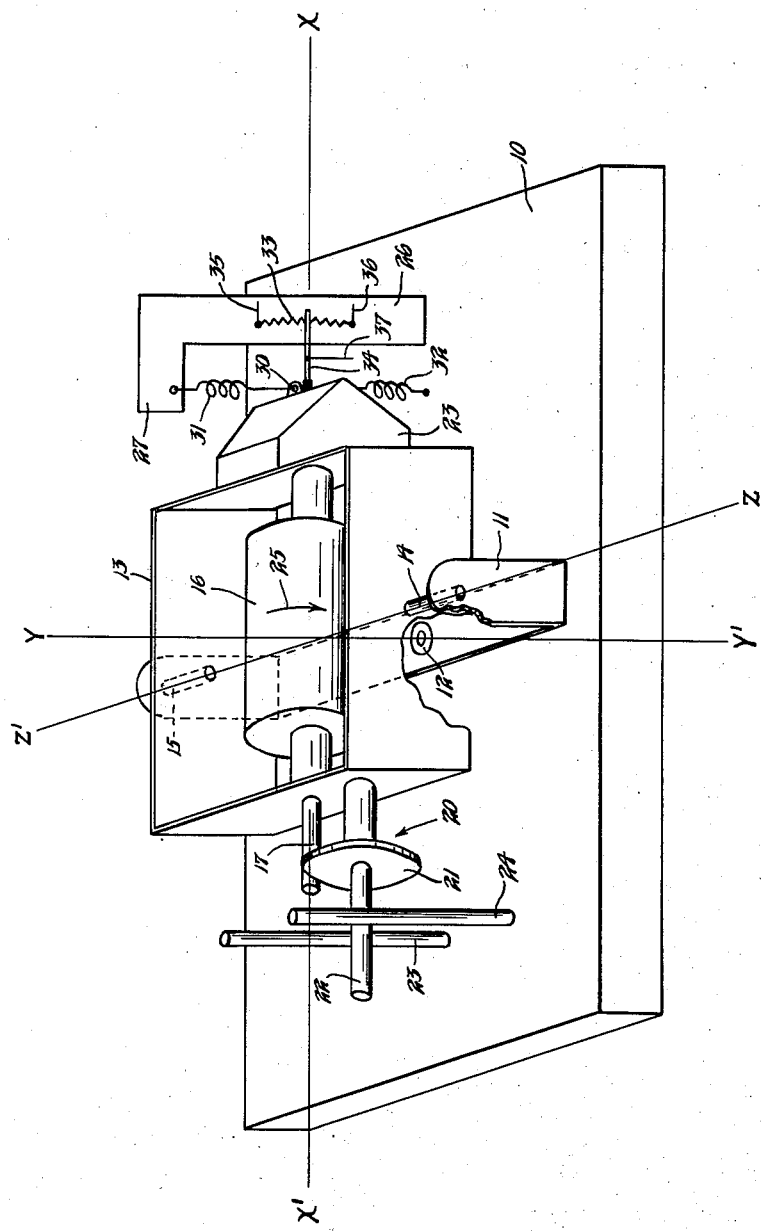
INVENTORS
WALDO H. KLIEVER
IRA H. JOHNSON
BY
George H. Fisher
ATTORNEY Patented June 27, 1950

2,512,746

UNITED STATES PATENT OFFICE 2,512,746

GYROSCOPIC INSTRUMENT

Waldo H. Kliever and Ira H. Johnson, Minneapolis, Minn., assignors to Minneapolis-Honeywell Regulator Company, Minneapolis, Minn., a corporation of Delaware Application September 24, 1945, Serial No. 618,150

7 Claims. (Cl. 74—5.5)

This invention relates to the field of aircraft instruments, and more particularly to gyroscopic instruments responsive to the rate of change in the attitude of the plane with respect to the stabilized axis of the gyroscope. Such instruments are particularly useful as rate-of-turn instruments, but have been previously subject to the disability of excessive hunting action, particularly when responding to rapid changes in the course of a craft such as occur, for example, during evasive movements of a military plane. Changes in the attitude of a craft due to rough air also take place more rapidly than the control instruments can completely correct, and this also tends to produce hunting.

It is a general object of this invention to provide a gyroscopic rate-of-turn instrument in which hunting is minimized.

It is another object of this invention to provide a gyroscopic rate-of-turn instrument in which energy is derived from the rotor of the gyroscope and utilized to supply a mechanical force opposing movement of the gyroscope from its normal position.

A more specific object of this invention is to provide frictional anti-hunt means for a gyroscopic rate-of-turn instrument, the energization for the anti hunt means being derived from the rotor of the gyroscope.

Various other objects, advantages and features of novelty which characterize this invention are pointed out with particularity in the claims annexed hereto and forming a part hereof. However, for a better understanding of the invention, its advantages, and objects obtained by its use, reference should be had to the subjoined drawing, which forms a further part hereof, and to the accompanying descriptive matter, in which we have illustrated and described a preferred embodiment of our invention.

The single figure of the drawing is a general showing in trimetric projection, of a gyroscopic instrument embodying our invention.

In the figure there is shown a base member 10 which may be considered as rigidly fastened to the craft to whose rate-of-turn the instrument is to be responsive. A yoke member 11 is mounted on base 10 as by pivot 12, for rotation about an axis Y—Y'.

A ring 13 is pivotally mounted in yoke 11, as by bearings 14 and 15, for rotation about an axis Z—Z' perpendicular to axis Y—Y'. A rotor 16 is pivotally mounted in ring 13 in suitable bearings, not shown, for rotation at high speed about an axis X—X', which is perpendicular to axis Z—Z' and which is also normally perpendicular to axis Y—Y'. Rotor 16 may be maintained in motion by any suitable electrical or pneumatic motor means, which comprise no part of the invention and which are not shown to avoid unnecessarily complicating the drawing.

The shaft of rotor 16 is extended as at 17. A second rotating member 20 is pivotally mounted in ring 13 and spaced from shaft 17, and comprises a disk 21 frictionally engaging shaft 17 in driven relationship therewith, and an extended shaft 22 rotated integrally with disk 21. A counterweight 23 is mounted on ring 13 to balance it about the X—X' and Z—Z' axes so that the weight of member 20 is not effective to cause precession of the gyroscope.

Projecting upwardly from base 10 are a pair of rods 23 and 24, so located and so spaced that when the gyroscope is in its normal condition shaft 22 extends between them without making contact with either one, and yet without substantial clearance. Any appreciable rotation of yoke 11 about pivot 12 is effective to cause contact between rotating shaft 22 and one or the other of the rods 23 and 24. It will be appreciated that since rotor 16 rotates in a single direction, as indicated by arrow 25, contact of shaft 22 with rod 24 is effective to apply to ring 13 a counterclockwise torque around axis Z—Z', while contact of the shaft with rod 23 results in the application to ring 13 of a torque acting clockwise around axis Z—Z'.

A bracket 26 projects from base 10 and includes an arm 27 projecting over counterweight 23, from which there extends a stud 30. Stud 30 is connected with arm 27 and base 10, respectively, by a pair of springs 31 and 32 whose tensions are equal when the gyroscope is in its normal position. Movement of ring 13 about the axis Z—Z' actuates an adjustable voltage divider comprising a resistance winding 33, carried by and insulated from bracket 26, and a cooperating slider 34 carried by and insulated from ring 13. Electrical connection may be made with winding 33 by conductors 35 and 36, and with slider 34 by conductor 37.

Operation

In use, our instrument is mounted in an aircraft or other vehicle in such a fashion that in the normal attitude of the craft the axis Y—Y' is vertical. It is also more convenient to mount the instrument so that the axis X—X' is parallel to the fore-and-aft axis of the craft, although this is not essential. If rotor 16 has reached its operative speed, and if no change in the heading of the craft takes place, the gyroscope maintains its normal position, shaft 22 does not contact either member 23 or member 24, and wiper 34 is stationary midway along winding 33. If a change takes place in the heading of the craft, base 10 rotates about axis Y—Y' with respect to ring 13, which is stabilized by the rigidity of the gyroscopic rotor. Only a very slight movement is possible however, before shaft 22 comes into contact with member 23 or member 24, and thereafter rotary movement between base 10 and ring 13 is impossible. Continued rotation of base 10 applies a radial force to shaft 22 tending to bring about rotation of rotor 16 about the Y—Y' axis, and this is translated precessively into rotation of the rotor about the Z—Z' axis, thus displacing slider 34 from its central position along winding 33, and stretching one of springs 31 and 32 while allowing the other to contract beyond its normal condition.

While this movement is taking place, frictional tangential contact between rotating shaft 22 and the member which it contacts is applying a torque about the Z—Z' axis which opposes the precessive movement. This force is not of sufficiently great magnitude, compared to the precessional forces involved, to appreciably affect the accuracy of the reading of the instrument as evidenced by the change in resistances perceptible through conductors 35, 36, and 37, so that the displacement of slider 34 is actually a measurement of the rate at which the heading of the craft is being changed.

When the craft straightens out the precessing force applied to ring 13 through shaft 22 decreases to zero, and the slider 34 returns to its normal position. In theory, when the craft has attained a constant rate-of-turn the slider comes to rest on its winding, regardless of whether the acceleration by which the angular velocity is reached is great or small. In actual practice, prior to our invention, this was not the case. The slider did not make a dead beat approach to its position, but moved temporarily past its position to some position on the other side, thus giving a spurious indication of rate-of-turn in the opposite direction. With our present invention, any movement of slider 34, carried by ring 13, away from central position in either direction is opposed not only by springs 31 and 32, in a degree proportional to the displacement, but by the tangential friction between shaft 22 and the appropriate vertical rod which acts as a damping device to absorb the energy otherwise available to cause overshooting of the instrument. While it is true that the friction reduces the magnitude of the response of the instrument to a given rate-of-turn, this disadvantage is more than compensated for by the efficient damping of hunting which might otherwise occur.

Numerous objects and advantages of our invention have been set forth in the foregoing description, together with details of the structure and function of the invention, and the novel features thereof are pointed out in the appended claims. The disclosure however is illustrative only, and we may make changes in details, especially in matters of shape, size, and arrangement of parts, within the principle of the invention, to the full extent indicated by the broad general meaning of the terms in which the appended claims are expressed.

We claim as our invention:

1. In a rate-of-turn instrument: a gyroscopic rotor having a normally horizontal spin axis; a support for said rotor; means mounting said rotor on said support for pivotal movement of said spin axis about second and third axes normally perpendicular thereto, said second axis being perpendicular to said support; means resiliently opposing said pivotal movement about said third axis; and means limiting said pivotal movement about said second axis; said means comprising cooperating components carried by said mounting means and said support, in normally disengaged relationship, for frictional engagement upon relative movement between said mounting means and said support to oppose precessive pivotal movement of said gyroscope about said third axis.

2. In a device of the class described, in combination: a gyroscopic rotor having a spin axis; a support member; cardanic means, including a plurality of yoke members, for pivotally mounting said rotor upon said support member; means resiliently restraining movement of one of said yoke members with respect to said support; and means preventing appreciable movement between said support and another of said yoke members; said last named means including cooperating components carried by said support member and said first named yoke member in normally disengaged relation; one of said components comprising means maintained in rotation by said rotor; another of said components comprising means adapted to frictionally engage said rotating means upon initial movement of said yoke member with respect to said support.

3. A rate-of-turn instrument comprising, in combination: a gyroscopic rotor; a yoke pivotally mounting said rotor; a second yoke pivotally mounting said first yoke; a support pivotally mounting said second yoke; means resiliently connecting said first yoke with said support to oppose pivotal movement therebetween; and damping means carried in part by said first yoke and in part by said support and energized by the rotational energy of said rotor to actively oppose pivotal movement between said first yoke and said support, and to prevent appreciable pivotal movement between said second yoke and said support.

4. A rate-of-turn instrument comprising, in combination: a gyroscopic rotor; a yoke pivotally mounting said rotor; a second yoke pivotally mounting said first yoke; a support pivotally mounting said second yoke; means resiliently connecting said first yoke with said support to oppose pivotal movement therebetween; and damping means preventing appreciable pivotal movement between said second yoke and said support and opposing pivotal movement between said first yoke and said support; said damping means comprising a rotating member journaled in said yoke and frictionally driven by said rotor.

5. A rate-of-turn instrument comprising, in combination: a gyroscopic rotor; a yoke pivotally mounting said rotor; a second yoke pivotally mounting said first yoke; a support pivotally mounting said second yoke; means resiliently connecting said first yoke with said support to oppose pivotal movement therebetween; and damping means preventing appreciable pivotal movement between said second yoke and said support and opposing pivotal movement between said first yoke and said support; said damping means comprising a rotating member journaled in said second yoke and frictionally driven by said rotor, and means fixed to said support and normally disengaged from said rotating member, for frictionally engaging said rotating member on initial pivotal movement between said second yoke and said support.

6. In a rate of turn gyroscope, a rotor having a spin axis, means mounting said rotor for restrained resilient movement about a second axis, means mounting said last named means for pivotal movement about a third axis, and frictional means, carried in part by said second named mounting means and in part by said first named mounting means for deriving from the rotational energy of said rotor a reaction force actively opposing precessive movement of said gyroscope about said second axis.

7. In a rate of turn gyroscope, a rotor, a yoke pivotally mounting said rotor, a second yoke pivotally mounting said first yoke, a support pivotally mounting said second yoke, means resiliently connecting said first yoke with said support to oppose pivotal movement therebetween, and damping means carried in part by said first yoke and in part by said support and energized by the rotational energy from said rotor to actively oppose pivotal movement between said first yoke and said support.

WALDO H. KLIEVER.
IRA H. JOHNSON.

REFERENCES CITED

The following references are of record in the file of this patent:

UNITED STATES PATENTS

| Number | Name | Date |
|---|---|---|
| 796,893 | Brennan | Aug. 8, 1905 |
| 1,642,087 | Rosenbaum | Sept. 13, 1927 |
| 1,736,039 | Gray | Nov. 19, 1929 |
| 2,299,663 | Tilstone et al. | Oct. 20, 1942 |
| 2,365,439 | Schulze | Dec. 19, 1944 |

FOREIGN PATENTS

| Number | Country | Date |
|---|---|---|
| 819,858 | France | July 19, 1937 |
| 565 | Great Britain | Nov. 18, 1915 |
| 331,627 | Great Britain | Feb. 3, 1940 |